United States Patent
Nakajima et al.

(10) Patent No.: US 9,697,082 B2
(45) Date of Patent: Jul. 4, 2017

(54) METHOD AND APPARATUS OF DISASTER RECOVERY VIRTUALIZATION

(71) Applicant: Hitachi, Ltd., Tokyo (JP)

(72) Inventors: Akio Nakajima, Santa Clara, CA (US); Akira Deguchi, Santa Clara, CA (US)

(73) Assignee: Hitachi, Ltd., Tokyo (JP)

(*) Notice: Subject to any disclaimer, the term of this patent is extended or adjusted under 35 U.S.C. 154(b) by 153 days.

(21) Appl. No.: 14/443,341

(22) PCT Filed: Mar. 14, 2013

(86) PCT No.: PCT/US2013/031548
§ 371 (c)(1),
(2) Date: May 15, 2015

(87) PCT Pub. No.: WO2014/142898
PCT Pub. Date: Sep. 18, 2014

(65) Prior Publication Data
US 2015/0331753 A1    Nov. 19, 2015

(51) Int. Cl.
*G06F 11/00* (2006.01)
*G06F 11/14* (2006.01)
(Continued)

(52) U.S. Cl.
CPC .......... *G06F 11/1415* (2013.01); *G06F 3/065* (2013.01); *G06F 3/067* (2013.01);
(Continued)

(58) Field of Classification Search
CPC .................................................. G06F 11/2023
(Continued)

(56) References Cited

U.S. PATENT DOCUMENTS 8,145,824 B1    3/2012  Mehrotra et al.
8,275,958 B2 *  9/2012  Kaiya ................... G06F 3/0617
                                                  711/162
(Continued)

FOREIGN PATENT DOCUMENTS

JP    2003-122509 A    4/2003
JP    2006-048676 A    2/2006
JP    2009-093316 A    4/2009

OTHER PUBLICATIONS

Office Action for JP 2015-545027, dispatched on Feb. 2, 2016.
International Search Report dated May 21, 2013, issued for International Application No. PCT/US2013/031548.

*Primary Examiner* — Elmira Mehrmanesh
(74) *Attorney, Agent, or Firm* — Procopio, Cory, Hargreaves & Savitch LLP

(57) ABSTRACT

Systems and methods described herein involve a virtual storage utilized to virtualize the storage of storage systems across multiple sites. The virtual storage is associated with a virtual multipath control. The virtual multipath control manages the virtual path state of the inter-physical storage, the remote copy volume state which has primary volume or secondary volume state, and the volume copy operation mode such as synchronous copy mode journal copy mode, or bitmap resync mode. The virtual multipath control of the virtual storage facilitates choices from the host for a preferred site, path, state, and volume by utilizing a virtual multipath state from a get virtual multipath information command.

19 Claims, 20 Drawing Sheets

(51) Int. Cl.
*G06F 3/06* (2006.01)
*G06F 11/20* (2006.01)

(52) U.S. Cl.
CPC .......... *G06F 3/0617* (2013.01); *G06F 3/0619* (2013.01); *G06F 3/0635* (2013.01); *G06F 3/0644* (2013.01); *G06F 3/0664* (2013.01); *G06F 3/0683* (2013.01); *G06F 11/2069* (2013.01); *G06F 11/2071* (2013.01); *G06F 2201/805* (2013.01); *G06F 2201/815* (2013.01)

(58) Field of Classification Search
USPC .......................................................... 714/15
See application file for complete search history.

(56) References Cited

U.S. PATENT DOCUMENTS

| | | | |
|---|---|---|---|
| 8,296,537 B2* | 10/2012 | Inoue | G06F 11/2058 707/648 |
| 8,301,854 B2* | 10/2012 | Nakagawa | G06F 3/0605 711/161 |
| 2002/0156987 A1 | 10/2002 | Gajjar et al. | |
| 2003/0051111 A1 | 3/2003 | Nakano et al. | |
| 2003/0172145 A1 | 9/2003 | Nguyen | |
| 2006/0031594 A1 | 2/2006 | Kodama | |
| 2006/0069889 A1* | 3/2006 | Nagaya | G06F 11/2071 711/162 |
| 2007/0239944 A1 | 10/2007 | Rupanagunta et al. | |
| 2009/0094403 A1 | 4/2009 | Nakagawa et al. | |
| 2010/0199038 A1* | 8/2010 | Ito | G06F 11/2074 711/113 |
| 2014/0068210 A1* | 3/2014 | Deguchi | G06F 9/5027 711/162 |

* cited by examiner

Physical storage resource table 50

| PS ID (51) | LUN (52) | Port WWN (53) | Relative PID (54) | RC Port list (55) | DR VVOL LUN (56) | DR Group (57) |
|---|---|---|---|---|---|---|
| 0x1234 | 0x0001 | WWPN A | 0x0001 | WWPN X | 0x100A | 1 |
|  |  | WWPN C | 0x0003 | WWPN Y |  |  |
|  | 0x0002 | WWPN B | 0x0002 | WWPN X | 0x100B | 1 |
|  |  | WWPN D | 0x0004 | WWPN Y |  |  |
| ... | ... | ... | ... | ... | ... | ... |

FIG. 5

Virtual storage resource table 60

| VS ID ~61 | PS ID ~51 | LUN ~52 | virtual RPID ~62 | RC Port list ~55 | DR VVOL LUN ~56 | DR Group ~57 | iVOL State ~63 |
|---|---|---|---|---|---|---|---|
| 0xABCD | 0x1234 | 0x0001 | 0x0001 | WWPN X | 0xAAAA | 1 | P-VOL |
| | | | 0x0003 | WWPN Y | | | |
| | | 0x0002 | 0x0002 | WWPN X | 0xBBBB | 1 | P-VOL |
| | | | 0x0004 | WWPN Y | | | |
| | | ... | ... | ... | ... | ... | ... |
| | 0x5678 | 0x0001 | 0x0005 | WWPN V | 0xAAAA | 1 | S-VOL |
| | | | 0x0007 | WWPN W | | | |
| | | ... | ... | ... | ... | ... | ... |
| | 0x9ABC | 0x0002 | 0x0011 | WWPN P | 0xAAAA | 1 | S-VOL |
| | | | 0x0012 | WWPN Q | | | |
| | | ... | ... | ... | ... | ... | ... |

FIG. 6

Virtual Multipath table 70

| VS ID 61 | DR VVOL LUN 56 | PS ID 51 | virtual RPID 62 | VOL State 57 | MP AAS 71 | Distance 72 | I/O state 73 |
|---|---|---|---|---|---|---|---|
| 0xABCD | 0xAAAA | 0x1234 | 0x0001 | P-VOL | Active | 0 (base) | Host I/O Active |
| | | | 0x0002 | | Active | | |
| | | 0x5678 | 0x0003 | S-VOL | Passive | 10 | Standby |
| | | | 0x0004 | | Passive | | |
| | | 0x9ABC | 0x0011 | S-VOL | Offline | 1000 | Async Copy offline |
| | | | 0x0012 | | Offline | | |
| ... | | | | | | | |

FIG. 7

Remote Copy Path table 80

| VS ID ~61 | DR VVOL LUN ~56 | PS ID ~51 | RC Port list ~55 | FC/IP Ping ~81 | NW Reachable ~82 | PS healthy ~83 |
|---|---|---|---|---|---|---|
| 0xABCD | 0xAAAA | 0x1234 | WWPN X | 0 (offset) | 0x00AA | Good |
| | | | WWPN Y | 0 (offset) | 0x00BB | |
| | | 0x5678 | WWPN V | 3 ms | 0x00AA | Good |
| | | | WWPN W | 3 ms | 0x00BB | |
| | | 0x9ABC | WWPN P | 100 ms | 0x00AA | Good |
| | | | WWPN Q | 100 ms | 0x00BB | |
| ... | | | | | | |

FIG. 8

| Sense | ASC/ASCQ | |
|---|---|---|
| Unit Attention | state is Changed | 901 |
| | state is transitioning | 902 |
| | ... | |
| Not Ready | LU not access, AAS in standby state | 903 |
| | LU not access, AAS in unavailable state | 904 |
| | LU not access, DR-VVOL under resync | 905 |
| | LU not access, DR-VVOL under S-VOL pair | 906 |
| | LU not access, internal VOL is OLD data | 907 |
| | LU not access, internal VOL mapped to S-VOL | 908 |
| | LU not access, I/O state is offline | 909 |
| | LU not access, I/O state is recovery required | 910 |
| | ... | |
| Check Condition | Illegal Request, Parameter Error | 911 |
| | ... | |

SCSI Response Code 90

FIG. 9

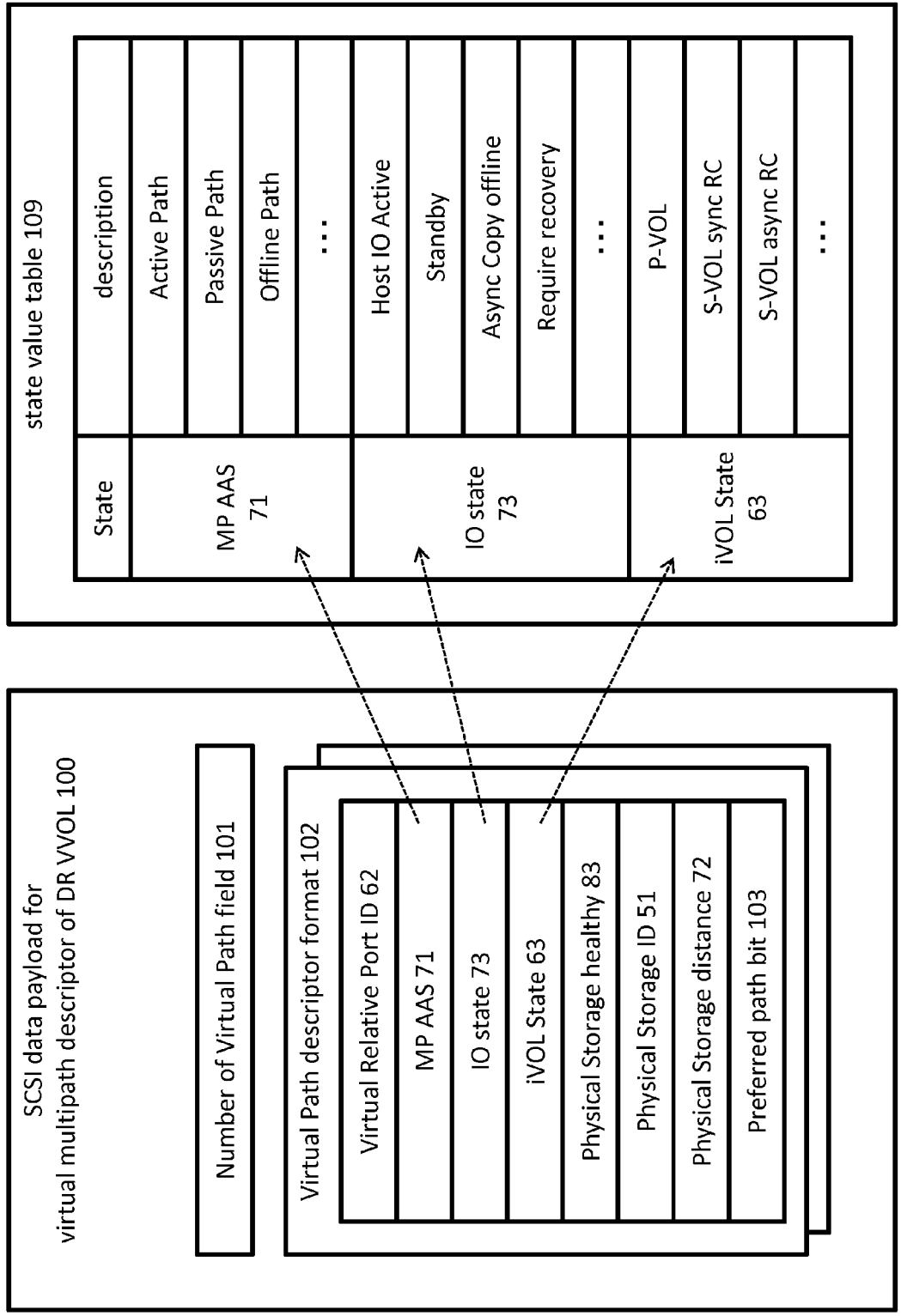

METHOD AND APPARATUS OF DISASTER RECOVERY VIRTUALIZATION

BACKGROUND

Field

The present application is related generally to computer and storage systems, interface protocols and disaster recovery technology, and more specifically, to disaster recovery upon storage system failure.

Related Art

In the related art, a logical volume is associated with a remote copy volume. The remote copy volume is associated with multiple states for input/output (I/O) such as allowing or denying I/O to the remote copy volume. The server administrator provides management of the volume states to prevent I/O access error during disaster recovery.

Disaster recovery (DR) management for storage systems can present various problems, since the server administrators of the respective storage systems may need to coordinate to configure among the various servers and storage systems, and test to operate failover or failback. For example, storage systems may be associated with two volume types, which are the primary volume and the secondary volume. During an asynchronous copy operation, there are several types of copy operations. For example, when a bitmap resync copy operation fails, then the copy volume may encounter consistency problems for applications or file systems associated with the copy volume. When a journal copy operation fails, then applications associated with the copy volume check the copy volume and may roll the copy volume back to a check point. The server administrator may need to configure a custom DR script to manage volume states to facilitate communication to the respective cluster software.

SUMMARY

Example implementations described herein may include a plurality of storage systems, which involve a first storage system associated with a first logical volume; and a second storage system associated with a second logical volume. The first storage system and the second storage system may be configured to provide a virtual volume from a plurality of virtual volumes to a plurality of computers, the virtual volume having a first status indicating the first logical volume as a primary volume and the second logical volume as a secondary volume forming a pair relationship with the primary volume for a remote copy procedure, such that data is stored to the first logical volume and the second logical volume based on the remote copy procedure, if the data is written from a first computer of the plurality of computers to the virtual volume; and change a status of the virtual volume from the first status to a second status indicating the second logical volume as the primary volume for an occurrence of failure of the first storage system, so that data is stored to the first logical volume and the second logical volume based on the remote copy procedure, if the data is written from a second computer of the plurality of computers to the virtual volume.

Example implementations described herein may further include a storage system having a controller; and a plurality of storage devices controlled by the controller, the controller managing a logical volume corresponding to the plurality of storage devices. The controller may be configured to provide a virtual volume from a plurality of virtual volumes to a plurality of computers, the virtual volume having a first status indicating an external logical volume associated with an external storage system as a primary volume and the logical volume as a secondary volume forming a pair relationship with the primary volume for a remote copy procedure, such that data is stored to the external logical volume and the logical volume based on the remote copy procedure, if the data is written from a first computer of the plurality of computers to the virtual volume; and change a status of the virtual volume from the first status to a second status indicating the logical volume as the primary volume for an occurrence of failure of the external storage system, so that data is stored to the external logical volume and the logical volume based on the remote copy procedure, if the data is written from a second computer of the plurality of computers to the virtual volume.

Example implementations described herein may further include A computer readable storage medium storing instructions for executing a process. The instructions may include providing a virtual volume from a plurality of virtual volumes to a plurality of computers, the virtual volume having a first status indicating a first logical volume associate with a first storage system as a primary volume and a second logical volume associated with a second storage system as a secondary volume forming a pair relationship with the primary volume for a remote copy procedure, such that data is stored to the first logical volume and the second logical volume based on the remote copy procedure, if the data is written from a first computer of the plurality of computers to the virtual volume; and changing a status of the virtual volume from the first status to a second status indicating the second logical volume as the primary volume for an occurrence of failure of the first storage system, so that data is stored to the first logical volume and the second logical volume based on the remote copy procedure, if the data is written from a second computer of the plurality of computers to the virtual volume.

BRIEF DESCRIPTION OF THE DRAWINGS

FIG. 5 illustrates a physical storage resource table, in accordance with an example implementation.

FIG. 6 illustrates a virtual storage resource table, in accordance with an example implementation.

FIG. 7 illustrates a virtual multipath table, in accordance with an example implementation.

FIG. 8 illustrates a remote copy path table, in accordance with an example implementation.

FIG. 9 illustrates an example SCSI response code, in accordance with an example implementation.

FIG. 10(a) illustrates a data payload for report/set virtual multipath state of a DR VVOL command, in accordance with an example implementation.

FIG. 10(b) illustrates an example state value table of MP AAS, I/O state, and internal VOL state, in accordance with an example implementation.

DETAILED DESCRIPTION

Figure 1:
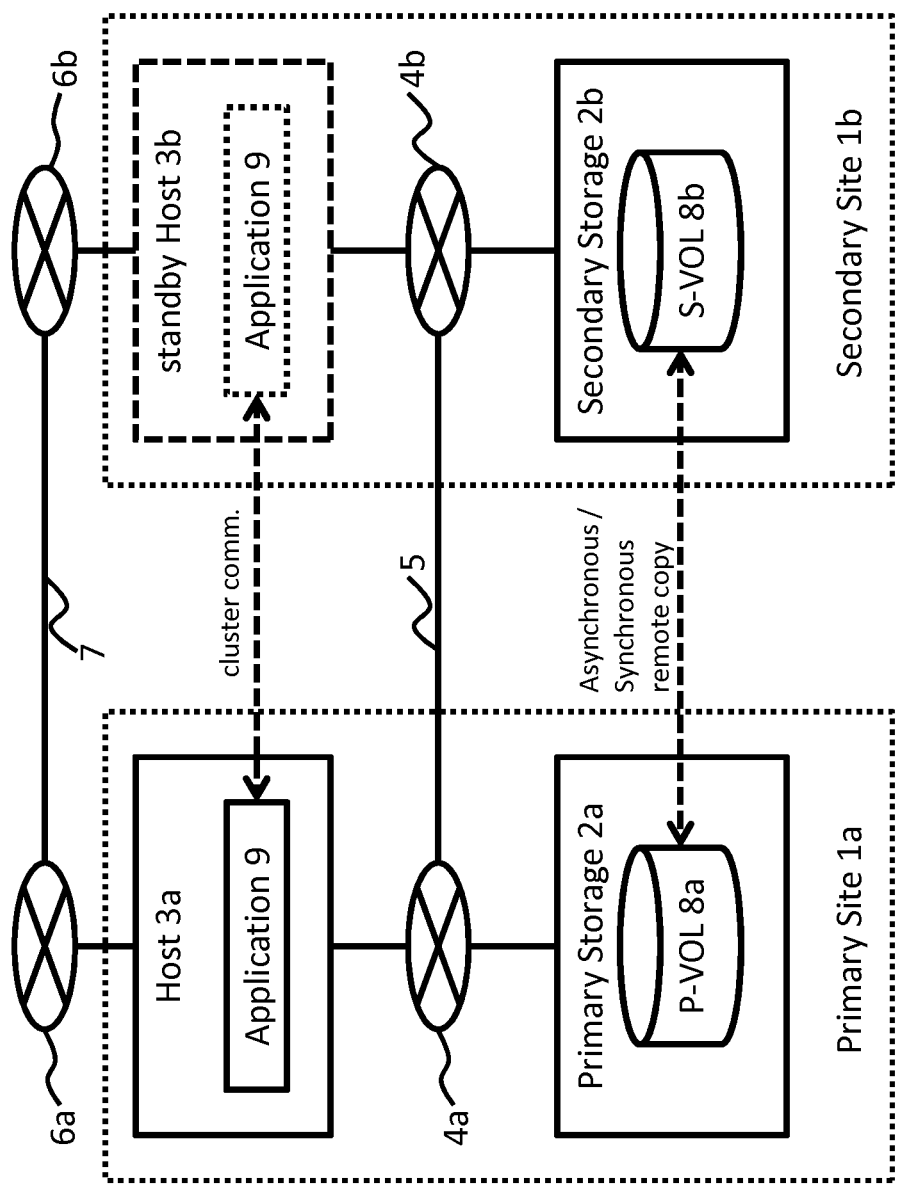
FIG. 1 is example environment of a synchronous or asynchronous remote copy volume.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The implementations described herein are also not intended to be limiting, and can be implemented in various ways, depending on the desired implementation.

In an example implementation, a virtual storage is utilized to virtualize the storage of storage systems across multiple sites. The virtual storage is associated with a virtual multipath control. The virtual multipath control manages the virtual path state of the inter-physical storage, the remote copy volume state which has primary volume or secondary volume state, and the volume copy operation mode such as synchronous copy mode journal copy mode, or bitmap resync mode. The virtual multipath control of the virtual storage facilitates choices from the host for a preferred site, path, state, and volume by utilizing a virtual multipath state from a get virtual multipath information command. The virtualization allows server administrators to setup disaster recovery environment without coordinating among the various server and storage administrators.

FIG. 1 is example environment of a synchronous or asynchronous remote copy volume. The environment may contain two or more sites (1a, 1b), two or more storage systems (2a, 2b), two or more hosts (3a, 3b), associated storage area networks (SAN) (4a, 4b), remote copy path(s) 5, associated internet protocol (IP) networks (6a, 6b), associated inter site network(s) 7, two or more remote copy pair volumes (8a, 8b), and associated application 9.

In the related art, administrators manage a primary site 1a and a secondary site 1b respectively, since each of the components for the primary site 1a, (e.g., host 3a, primary storage 1a, host 3a, storage network 4a, IP network 6a, etc.) have different identifiers or may be configured for different environments as compared to the components for the secondary site 1b.

Figure 2:
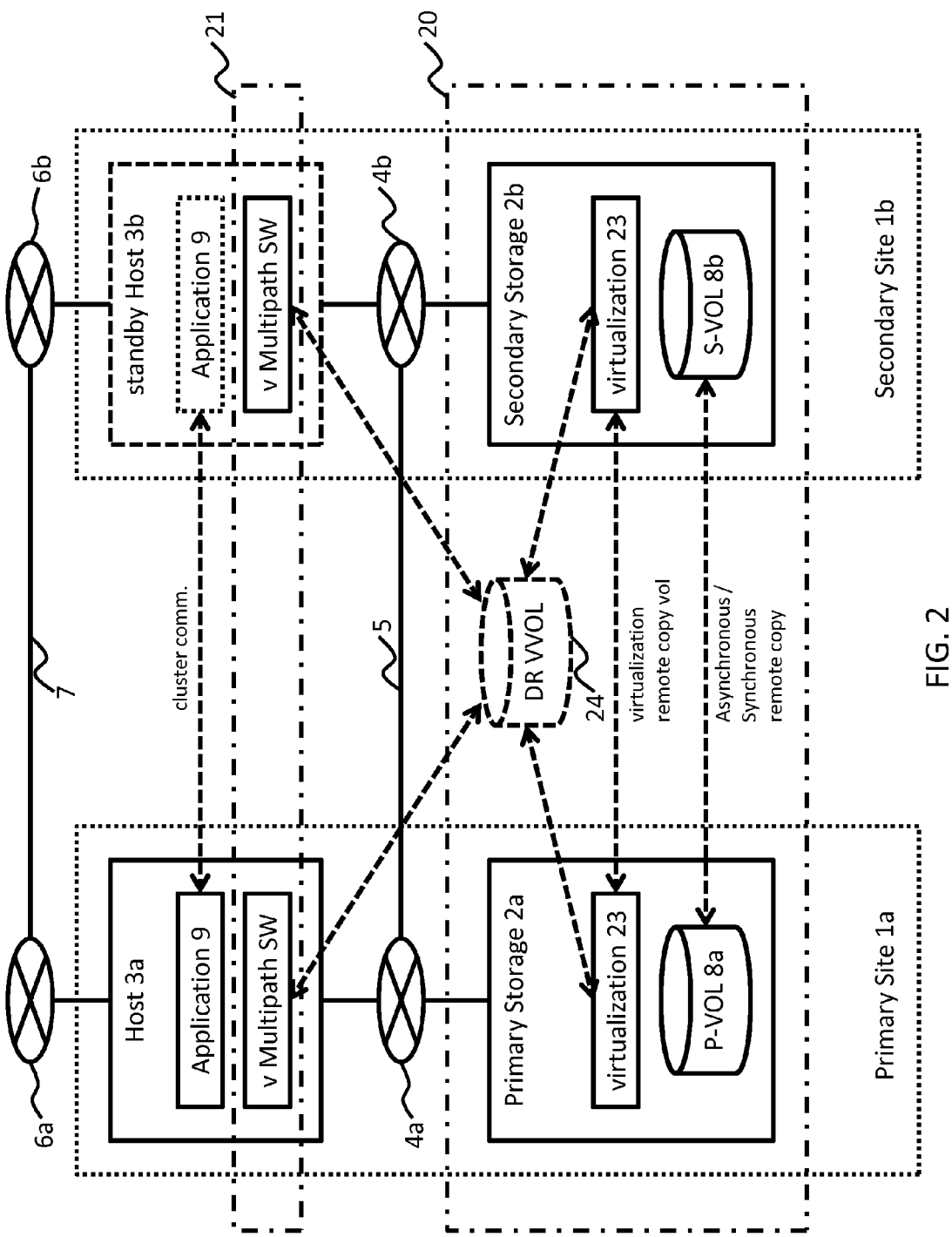
FIG. 2 is example environment of storage virtualization for synchronous or asynchronous remote copy configuration, in accordance with an example implementation.

FIG. 2 is example environment of storage virtualization for synchronous or asynchronous remote copy configuration, in accordance with an example implementation. In an example implementation, the environment contains virtual storage 20. The virtual storage 20 may include the primary storage 2a and the secondary storage 2b. Each of the physical storages 2a and 2b has virtualization software 23 facilitating communications for each physical storage. The virtualization software 23 also provides the primary volume (P-VOL) 8a and the secondary volume (S-VOL) 8b as a virtualized pair to the Disaster Recovery (DR) Virtual Volume (VVOL) 24. Each of the physical hosts 3a and 3b have virtual multipath software 21 configured to share information regarding DR VVOL 24.

The DR VVOL 24 has a virtual multipath state which facilitates access to the inter physical storage system. For example, a path is provided to the P-VOL in the primary physical storage 2a and may be configured to be accessible. Another path is provided to the S-VOL in the secondary physical storage 2b and may be configured to be not accessible.

Also, the virtual multipath state may have associated consistency and/or copy states of each P-VOL and S-VOL. For example, from the multipath state of DR VVOL, the cluster software can recognize a site as accessible or as not accessible, can recognize that the DR VVOL is under a state of synchronous remote copy from remote copy differential data, and can also recognize that the DR VVOL data is stale due to failure of the primary physical storage and loss of differential data.

Figure 3B:
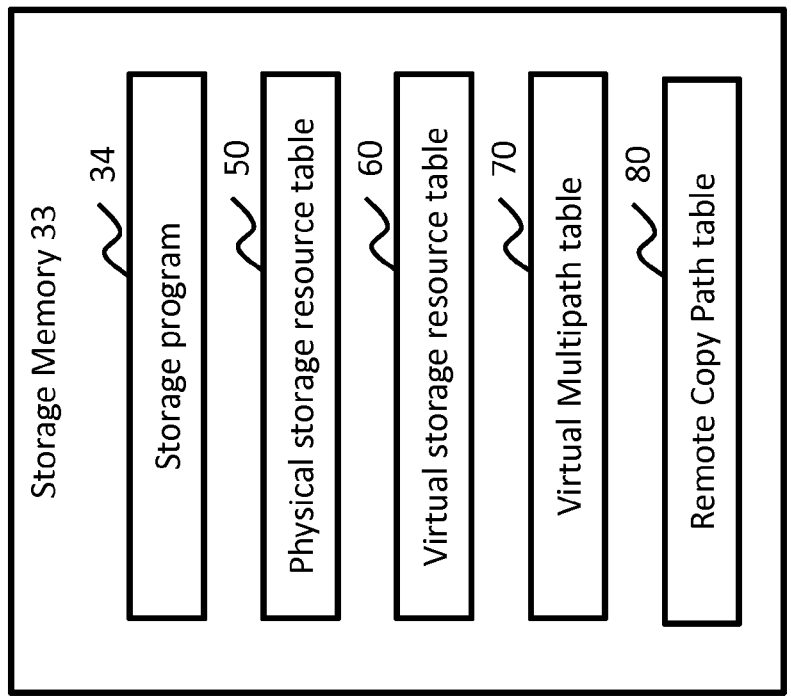
FIGS. 3(a) and 3(b) illustrate an example environment of a storage system and a storage memory, in accordance with an example implementation.
Figure 3A:
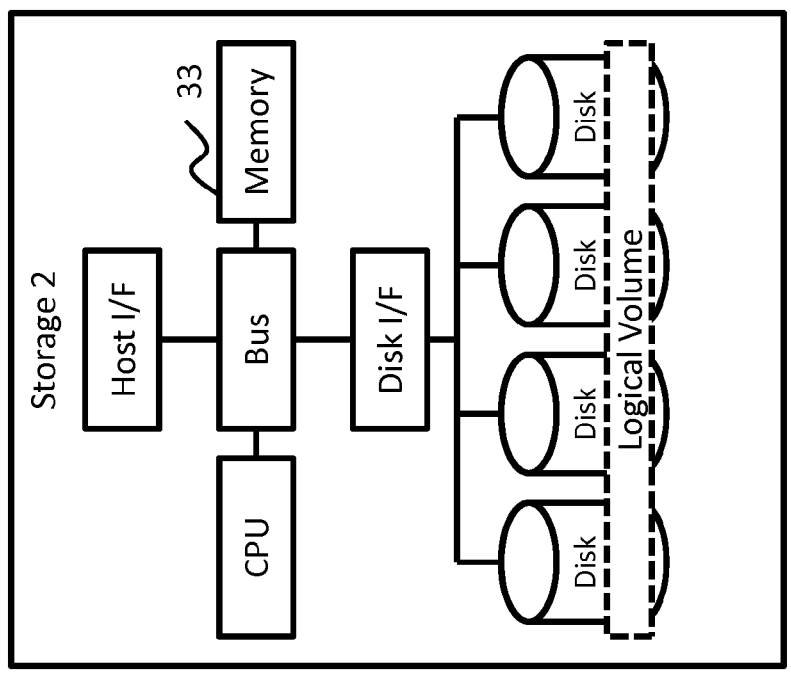

FIGS. 3(a) and 3(b) illustrate an example environment of a storage system 2 and a storage memory 33, in accordance with an example implementation. The physical storage system 2 may involve a host interface (I/F) which facilitate interactions from the host, a CPU, a Memory, a Disk I/F and one or more disks (e.g. hard disk drives (HDDs), solid state drives (SSDs), etc.) which work to form a logical volume for the storage system 2. The components may be interconnected by a Bus I/F such as peripheral component interconnect (PCI), double data rate (DDR), and small computer system interface (SCSI).

Storage memory 33 may include a storage program 34, a physical resource table 50, a virtual storage resource table 60, a virtual multipath table 70, and a remote copy path table 80. Storage memory 33 may be in a form of a computer readable storage medium, which includes tangible media such as flash memory, random access memory (RAM), HDD, or the like. Alternatively, a computer readable signal medium can be used instead of a storage memory 33, which can be in the form of non-tangible media such as carrier waves. The storage memory 33 and the CPU may work in tandem to function as a storage controller for the storage system 2.

Figure 4B:
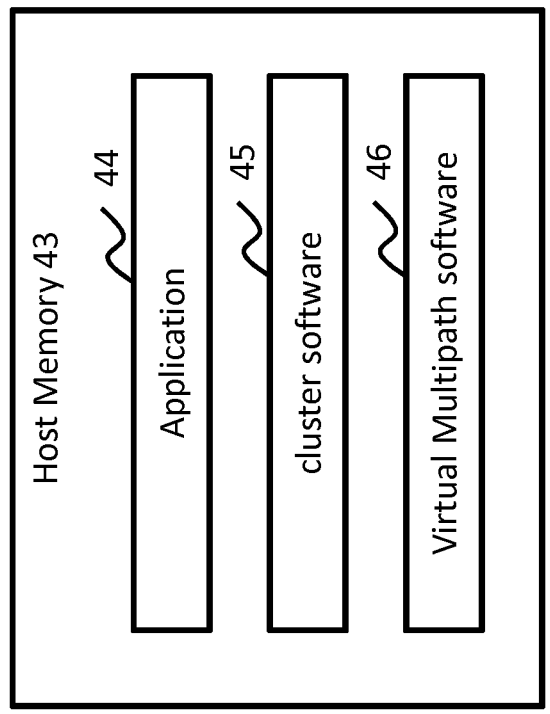
FIGS. 4(a) and 4(b) illustrate an example environment of a host server and a host memory, in accordance with an example implementation.
Figure 4A:
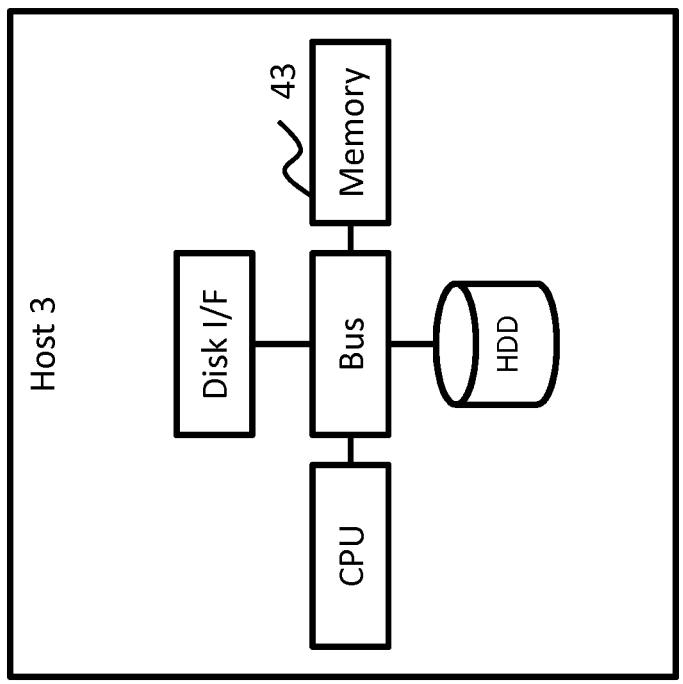

FIGS. 4(a) and 4(b) illustrate an example environment of a host server 3 and a host memory 43, in accordance with an example implementation. Each physical host 3 can be implemented as a computer, and may include a CPU, a Memory, a Disk I/F which connect to a storage system, and one or more HDDs, which are interconnected by a Bus I/F such as PCI, DDR, and SCSI. The host memory 43 may contain application software 44, cluster software 45, and virtual multipath software 46. Host memory 33 may be in a form of a computer readable storage medium, which includes tangible media such as flash memory, random access memory (RAM), HDD, or the like. Alternatively, a computer readable signal medium can be used instead of a host memory 43, which can be in the form of non-tangible media such as carrier waves. The host memory 43 and the CPU may work in tandem to function as a host controller for the host 3.

FIG. 5 illustrates a physical storage resource table 50, in accordance with an example implementation. The table 50 may contain a Physical Storage Identifier (PS ID) 51, a Logical Unit Number (LUN) 52, a Host Port World Wide Name (WWN) local multipath list 53, a relative port offset ID 54, a Remote Copy (RC) Port WWN local resource list 55, a DR VVOL LUN 56, and a DR Grouping ID 57. The physical storage resource table 50 provides a mapping for the logical volumes of the storage systems to the respective virtual volume, as well as providing a list of access ports.

FIG. 6 illustrates a virtual storage resource table 60, in accordance with an example implementation. The table 50 further extends from the physical storage resource table 50, and contains a Virtual Storage (VS) ID 61, a virtual relative port id 62, and a state of a DR internal volume (iVOL state) 63. DR VVOL LUN 56 provides pair information for the P-VOL and S-VOL pairs of the virtual storage.

The state of the DR internal volume 63 contains P-VOL or S-VOL information and may further indicate information as to whether the volume is associated with synchronous or asynchronous remote copy operations. The internal volume state 63 designates a volume as P-VOL or S-VOL, and can be updated as needed. For example, if a primary site fails, then an S-VOL associated with the failed P-VOL may have its internal volume state changed to P-VOL.

FIG. 7 illustrates a virtual multipath table 70, in accordance with an example implementation. The table 70 manages information for the multipath state of the DR VVOL LUN 56. The Multipath Asynchronous Access State (MP AAS) 71 contains information regarding the physical (intra physical multipath) and virtual (inter physical multipath) states of the DR VVOL. The DR Distance offset field 72 is information for determining distance (e.g. long or short) or latency, which is calculated by Fibre Channel SAN (FC-SAN) or IP-SAN ping information. For example within 100 km or 5 ms latency, synchronous remote copy operations can be performed. For longer distances, asynchronous copy operations may be performed while rejecting synchronous copy operations. The Host I/O state field 73 contains the host I/O state (e.g. active, standby, offline, etc.).

For example, if the primary site encounters a failure, then the host I/O state 73 is changed to standby for the primary site, and the secondary site (e.g., the site with the nearest distance) may be changed to active. In another example, if the primary and the nearest secondary site both encounter failure, then MP AAS of a S-VOL located further away is changed from an offline to an online state, wherein an application recovery or file system check (FSCK) sequence is applied to the S-VOL. The VOL state 57 of the secondary S-VOL located further away is changed from S-VOL to P-VOL state, and the host I/O state 73 is changed from offline to online state.

FIG. 8 illustrates a remote copy path table 80, in accordance with an example implementation. The table 80 provides information based on the DR VVOL LUN 56, and may contain a physical storage ID 51, a Remote copy port list 55, distance information based on FC/IP ping status 81, FC/IP SAN network (NW) reachable information 82, and physical storage healthy status field 83. The physical storage health status field 83 can indicate the health status of the physical storage, and can include various status states depending on the desired implementation (e.g., good, dead, failed, busy, etc.).

FIG. 9 illustrates an example SCSI response code 90, in accordance with an example implementation. SCSI response code 90 may include a sense code, and an additional status code/qualifier (ASC/ASCQ). The SCSI response code is used to provide notification of state change when the multipath AAS, DR VVOL state, or the host I/O state is changed. The SCSI response code 90 may also provide an error status when host I/O is received during an offline, inactive or internal state of S-VOL (do not access host I/O) status.

In example use cases, the sense code of "Unit Attention" may be used to return I/O to notify state change and to inform the host to get the virtual multipath table. The ASC/ASCQ of "State is changed" 901 is a notification that the AAS, DR-VVOL state or internal VOL state is changed. The host virtual multipath software may thereby update to a new state accordingly. The ASC/ASCQ of "State is transitioning" 902 is a notification that the AAS, DR-VVOL state or internal VOL state is changing. The host virtual multipath software may thereby wait to update the new state.

In example use cases, the Sense code of "Not Ready" is used to return I/O state for the host to reissue to other paths. The ASC of LU not access indicates to the host not to access the LU due to ASCQ reasons. The ASC/ASCQ of "LU not access, AAS in standby state" 903 indicates an asynchronous access state (AAS) of the specific path of the physical multipath pair of the physical storage, and further indicates a standby state. The host multipath software may thereby reroute host I/O to another physical path of the physical multipath pair.

The ASC/ASCQ of "LU not access, AAS in unavailable state" 904 indicates an asynchronous access state (AAS) of the specific path of the physical multipath pair of the physical storage, and further indicates an unavailable state. The host multipath software may thereby reroute host I/O to another physical path of the physical multipath pair.

The ASC/ASCQ of "LU not access, DR-VVOL under resync" 905 indicates that the DR-VVOL state is S-VOL and under data operation from using bitmap differential copy. The host virtual multipath software may thereby search and reroute I/O to another path which can access a logical volume with a P-VOL state. If DR-VVOL is not P-VOL state, then the host virtual multipath software may also wait for the transition of the DR-VVOL to the P-VOL state after the resync copy operation is finished.

The ASC/ASCQ of "LU not access, DR-VVOL under S-VOL pair" 906 indicates that the DR-VVOL state is S-VOL and under a data copy operation from using journal copy. The host virtual multipath software may thereby search and reroute I/O to another path that can access a volume with the P-VOL state. If DR-VVOL is not P-VOL state, then the host virtual multipath software may also wait for the transition of the DR-VVOL to the P-VOL state after the pair split is finished.

The ASC/ASCQ of "LU not access, internal VOL is OLD data" 907 indicates that the DR-VVOL state is S-VOL that contains old data due to a failed journal copy pair split. The host virtual multipath software may thereby recover the volume by using FSCK or a database recovery sequence.

The ASC/ASCQ of "LU not access, internal VOL mapped to S-VOL" 908 indicates that the DR-VVOL is mapped to another old S-VOL which includes recent local copy backup data. The host virtual multipath software may recover the volume by using FSCK or a database recovery sequence, wherein the application detects and parses old data.

The ASC/ASCQ of "LU not access, I/O state is offline" 909 indicates that the I/O state of DR-VVOL is offline due to a transition from P-VOL to S-VOL. The host virtual multipath software reroutes to other paths which can access the P-VOL or, for paths not ready for the change from S-VOL to P-VOL, to wait for resync and change the internal path from DR VVOL to S-VOL virtual path.

The ASC/ASCQ of "LU not access, JO state is recovery required" 910 indicates that the DR-VVOL state is S-VOL, and contains old data due to a failed journal copy pair split. The host virtual multipath software may recover the volume by using FSCK or a database recovery sequence.

The sense code of "Check Condition" may be used for command parameters. The ASC/ASCQ of "Illegal Request, Parameter Error" 911 indicates that the command contains a parameter error.

FIG. 10(*a*) illustrates a data payload for report/set virtual multipath state of a DR VVOL command, in accordance with an example implementation. The virtual multipath descriptor of DR VVOL 100 contains the number of virtual path field 101, and one or more data payloads in the form of a Virtual Path descriptor format 102.

Then Virtual Path descriptor format 102 contains the Virtual Relative Port ID 62, and the following virtual path or internal volume or VVOL or physical resource state information: MP AAS 71, I/O state 73 and internal VOL state 63, Physical Storage healthy status 83, Physical Storage ID 51, Physical Storage distance 72, and Preferred path bit 103.

When the host issues the report virtual multipath command, the host receives data payload 100, wherein the host virtual multipath software gets status to determine which virtual path of the virtual storage is the active path.

When host issues the set virtual multipath command, the host sends data payload 100 based on read data of the descriptor, wherein the host virtual multipath software sets status for when the server administrator conducts the scheduled site maintenance.

FIG. 10(*b*) illustrates an example state value table 109 of MP AAS 71, I/O state 73, and internal VOL state 63, in accordance with an example implementation. The state value table illustrates various example states that can be associated with the MP AAS 71, the I/O state 73 and the iVOL state 63.

Figure 11:
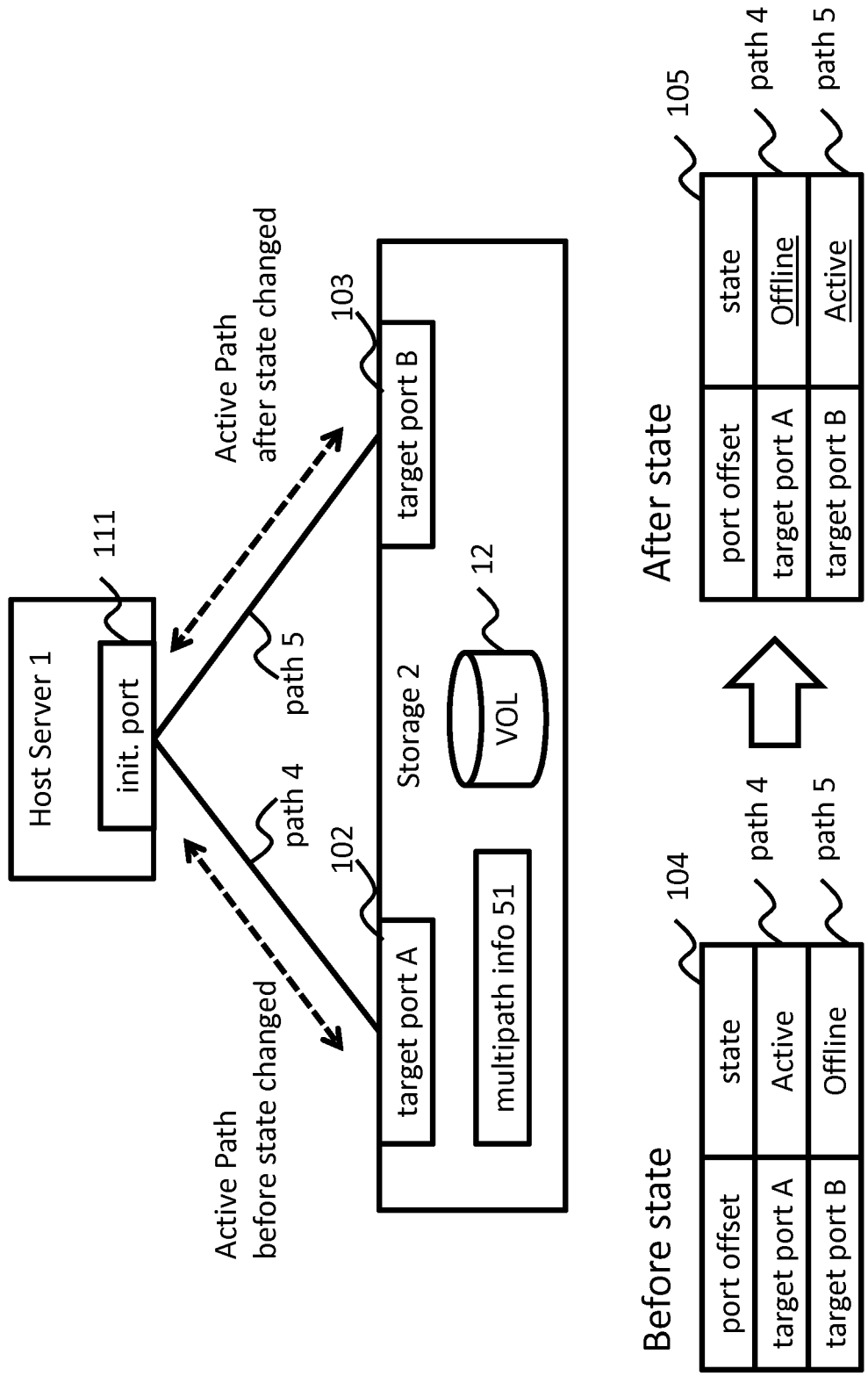
FIG. 11 illustrates a related art example of a multipath I/O path change flow.

FIG. 11 illustrates a related art example of a multipath I/O path change flow. The flow is initiated port and storage target port driven. The storage 2 has multipath state information 51 and storage volume 12. When the storage 2 notifies state change to host server 1 through port 111, host server 1 issue SCSI commands, such as the "Report Target Port Group" SCSI command (e.g. defined from Technical Committee 10, SCSI Primary Commands (T10 SPC)), to get multipath state information 51, such as the Target Port Group descriptor defined by T10 SPC. The Target Port Group descriptor has port offset identifier and asynchronous access state (AAS) defined by T10 SPC.

The multipath program of the host server 1 updates multipath state information from before state table 104 to after state table 105. The multipath program also changes the I/O path from path 4 to path 5 (e.g., changing the path from target port A 102 to target port B 103), since the storage program changes multipath state information from the state of "path 4 is active, path 5 is offline" to the state of "path 4 is offline, path 5 is active".

Figure 12:
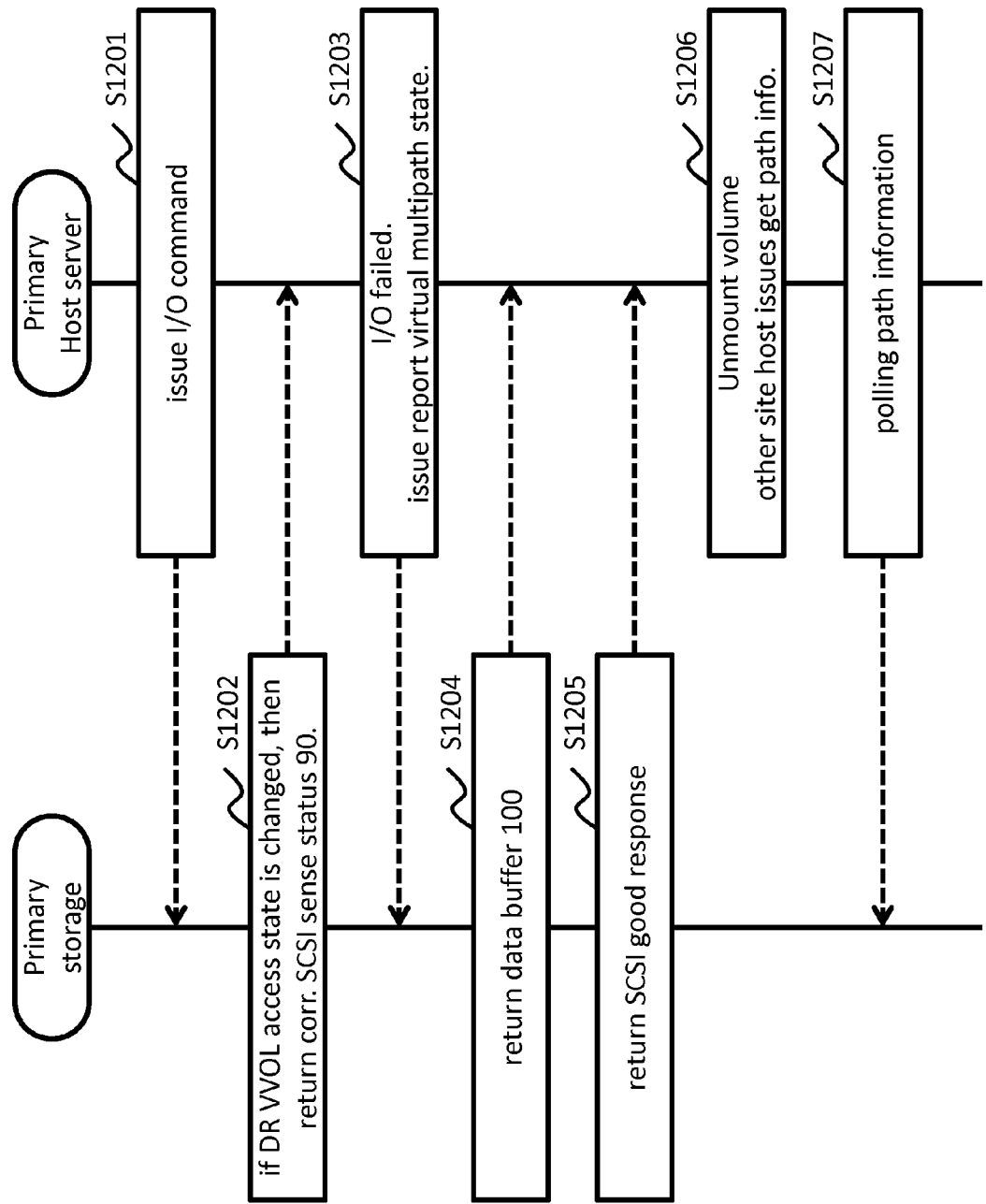
FIG. 12 is example radar chart of reporting a virtual multipath state of a DR VVOL command, in accordance with an example implementation.

FIG. 12 is example radar chart of reporting a virtual multipath state of a DR VVOL command, in accordance with an example implementation. At S1201, the host issues an I/O read or write command to the primary physical storage of the virtual storage. At S1202, if a notification indicating that the DR VVOL access state is changed to an offline state due to a storage system alert during host I/O is received, then the storage return the corresponding SCSI sense status 90. At S1203, the host I/O is indicated as failed by S1202. The host virtual multipath software issues a report virtual multipath state command to the storage which provided the state change notification. At S1204, the primary physical storage of the virtual storage returns the SCSI data payload for virtual multipath descriptor of DR VVOL 100, wherein the primary physical storage of the virtual storage gathers DR VVOL status of the virtual multipath state, the internal volume state, and so on. At S1205, the primary physical storage of virtual storage returns SCSI good status. At S1206, the primary host unmounts the volume when the host checks the DR VVOL status of S1204. At S1207, the host virtual multipath software checks the path information as needed (e.g., regular intervals, etc.).

Figure 13:
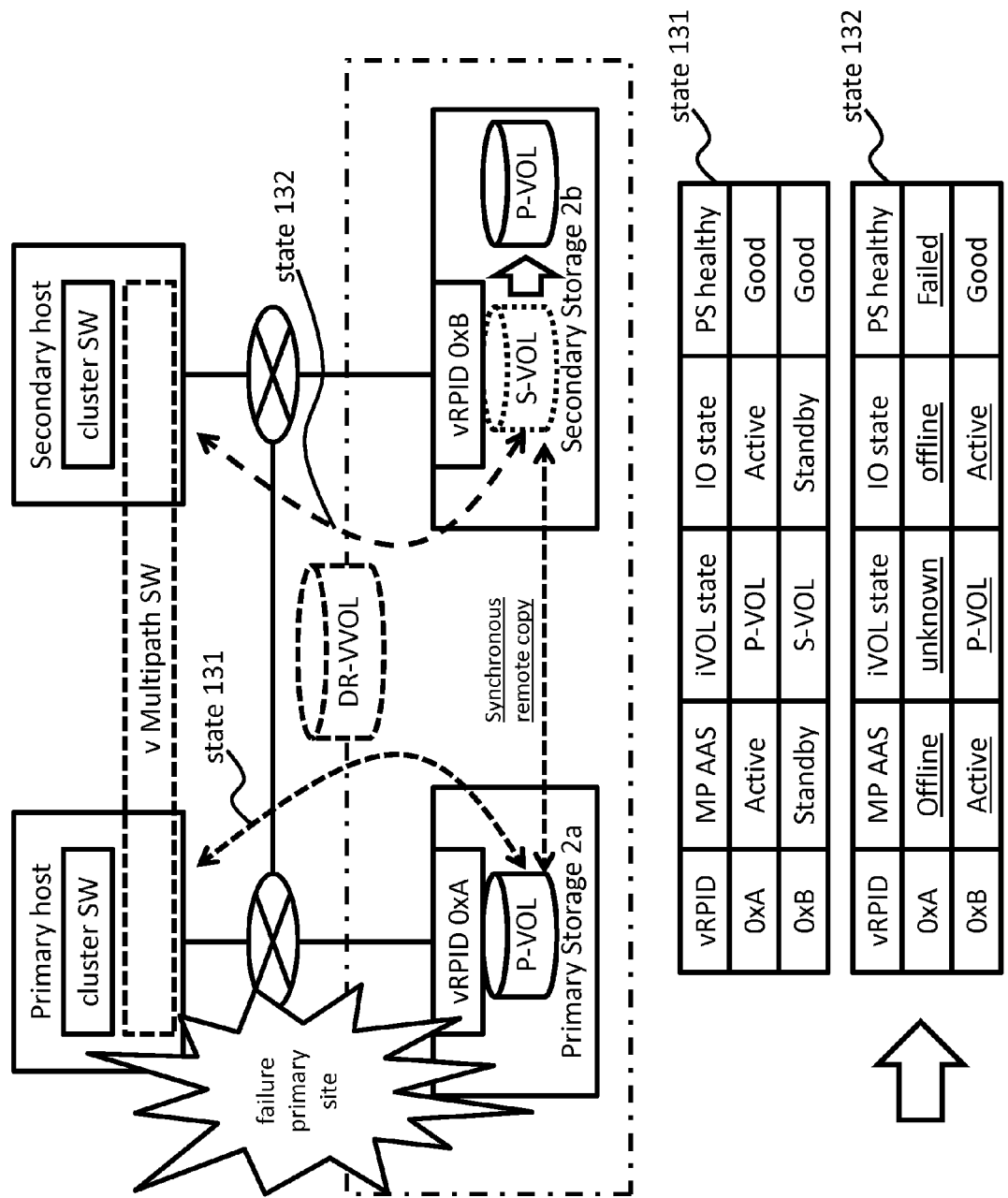
FIG. 13 illustrates a virtual multipath changed to a synchronous remote copy mode due to primary site failure.

FIG. 13 illustrates a virtual multipath changed to a synchronous remote copy mode due to primary site failure. The state 131 is the previous DR VVOL virtual multipath state before the primary site failure, wherein the MP AAS and I/O state of the primary storage is active and the MP AAS and I/O state of the secondary storage is standby. The state 132 is the DR VVOL virtual multipath state after the primary site failure, wherein the MP AAS and I/O state of the primary storage is offline and the MP AAS and I/O state of the secondary storage is active. Further details are provided in the description of FIG. 14.

Figure 14:
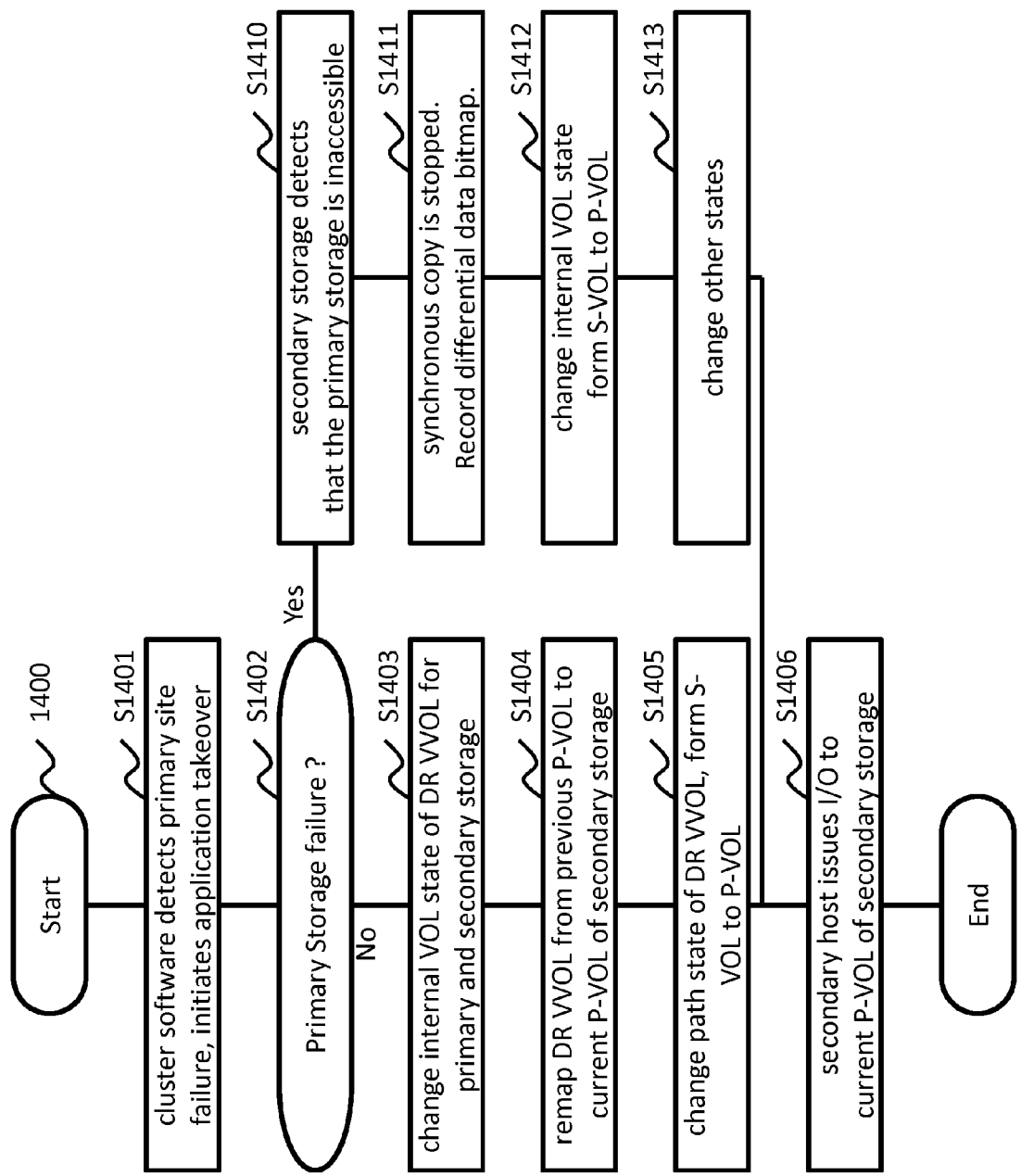
FIG. 14 illustrates an example flow chart for changing a virtual multipath state for a synchronous copy DR VVOL.

FIG. 14 illustrates an example flow chart 1400 for changing a virtual multipath state for a synchronous copy DR VVOL. At S1401, the cluster site detects a failure in the primary site and initiates application takeover. At S1402, if the secondary storage detects primary storage failure without a remote copy network failure (YES), then the flow proceeds to S1410, otherwise (NO), the flow proceeds to S1403. At S1403, the secondary physical storage of the virtual storage changes the internal VOL state of the secondary storage volume mapped to DR VVOL from the S-VOL of the secondary physical storage to the P-VOL state. Also, the primary physical storage of the virtual storage changes the internal VOL state of DR VVOL from P-VOL of primary physical storage to S-VOL state. The synchronous copy operation is swapped such that the source is the secondary physical storage and the destination copy is the primary storage. At S1404, the virtual storage remaps DR VVOL from the previous P-VOL of the primary storage to current P-VOL of the secondary storage internally. At S1405, the copy mode is synchronous, so the previous P-VOL and S-VOL contain the same data sets. Copy failure therefore does not occur. The secondary physical storage of the virtual storage changes the host I/O state from offline to online state and MP AAS is changed to active state if the previous MP AAS is not in the active state. At S1406, when the host virtual multipath software gets the virtual multipath information during the polling of multipath information or the cluster software communicates the detection of a primary site failure, the virtual multipath software of the secondary host updates the new state which is obtained from the secondary physical storage of the virtual storage, wherein the secondary host mounts DR VVOL and issues I/O to DR VVOL. Custom scripts for checking volume states and coordinating action can also be employed.

At S1410, the secondary storage detects that the primary physical storage is inaccessible due to primary physical storage failure. At S1411, the synchronous copy operation is stopped due to primary storage failure. The secondary storage starts to record differential data bitmaps when the failure is a remote copy network failure, and attempts to resync the primary physical storage. At S1412, the secondary physical storage of the virtual storage changes the internal VOL state of the secondary storage volume mapped to DR-VVOL from S-VOL of the secondary physical storage to P-VOL state. At S1413, the virtual storage internally changes the state of the DR-VVOL and changes the virtual multipath state accordingly. The state changes differ from S1404 and S1405 only for the health status of the primary storage (failure versus non-failure), and is otherwise the same as S1404 and S1405. The secondary host I/O conducts polling and updates the virtual multipath state, and proceeds to S1406.

Further, the application of the primary host does not need to wait for SCSI I/O timeout for detecting the primary storage failure, as the I/O timeout is longer than the time taken for virtual multipath state change. The virtual storage can detect the physical storage healthy status from the virtual multipath state change, and thereby quickly detect physical storage failure.

Figure 15:
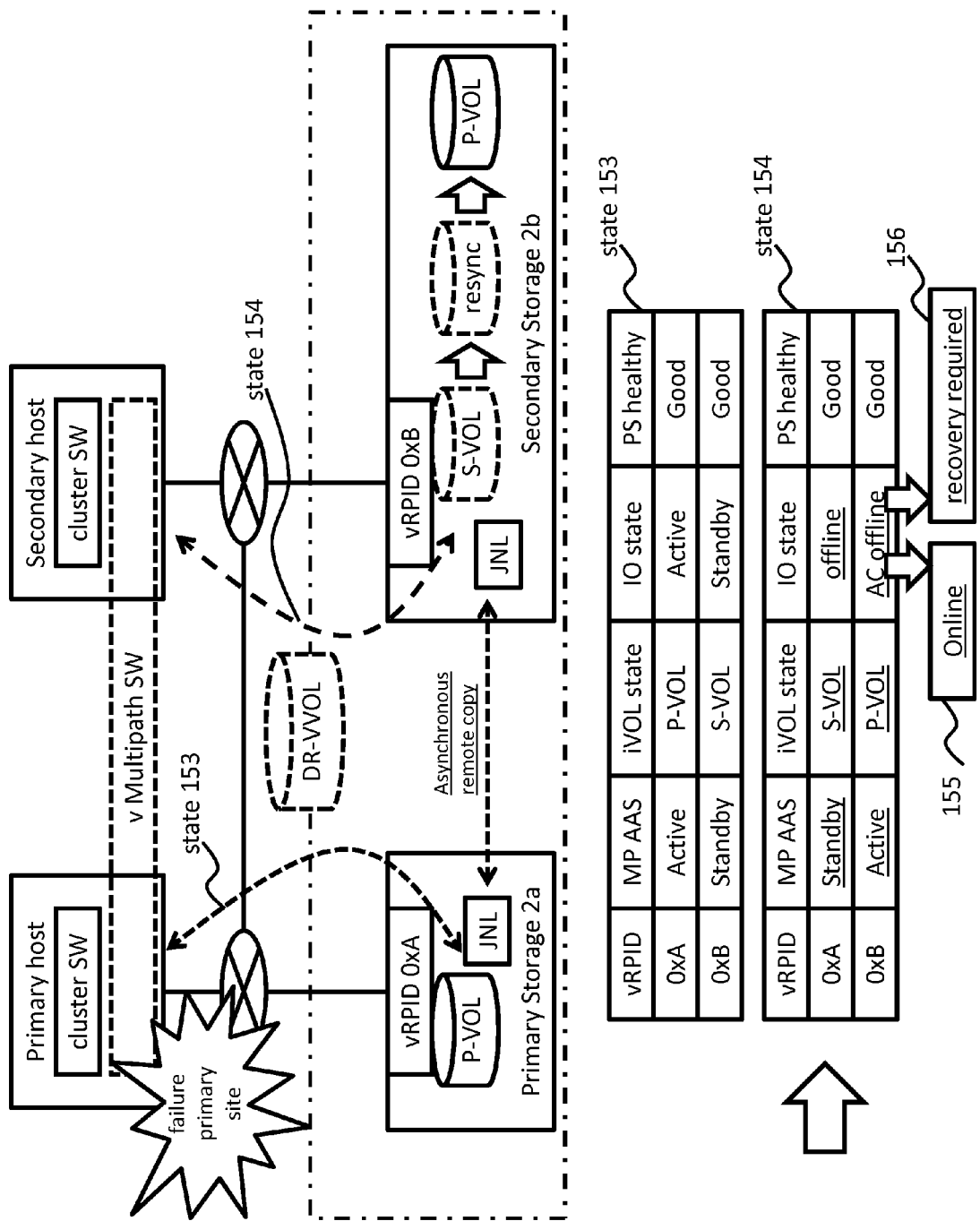
FIG. 15 illustrates a virtual multipath changed to asynchronous remote copy mode due to failure of the primary site, in accordance with an example implementation.

FIG. 15 illustrates a virtual multipath changed to asynchronous remote copy mode due to failure of the primary site, in accordance with an example implementation. The state 153 is the previous DR-VVOL virtual multipath state before primary site failure, wherein the MP AAS and I/O state of the primary storage is active and the MP AAS and I/O state of the secondary storage is standby. The state 154 is the DR-VVOL virtual multipath state after primary site failure, wherein the MP AAS and I/O state of the primary storage is standby and offline, respectively, and the MP AAS and of the secondary storage is active. The DR-VVOL state change process differs depending on whether the differential data of the primary site is sent successfully or has failed due to network error. The I/O state also changes depending on the failure situation. The I/O state is changed to "online state" 155 for a complete resync or a pair split, and changed to "recovery required" 156 for a failure to copy over completely due to remote copy network failure. Further details are provided in FIG. 16.

Figure 16:
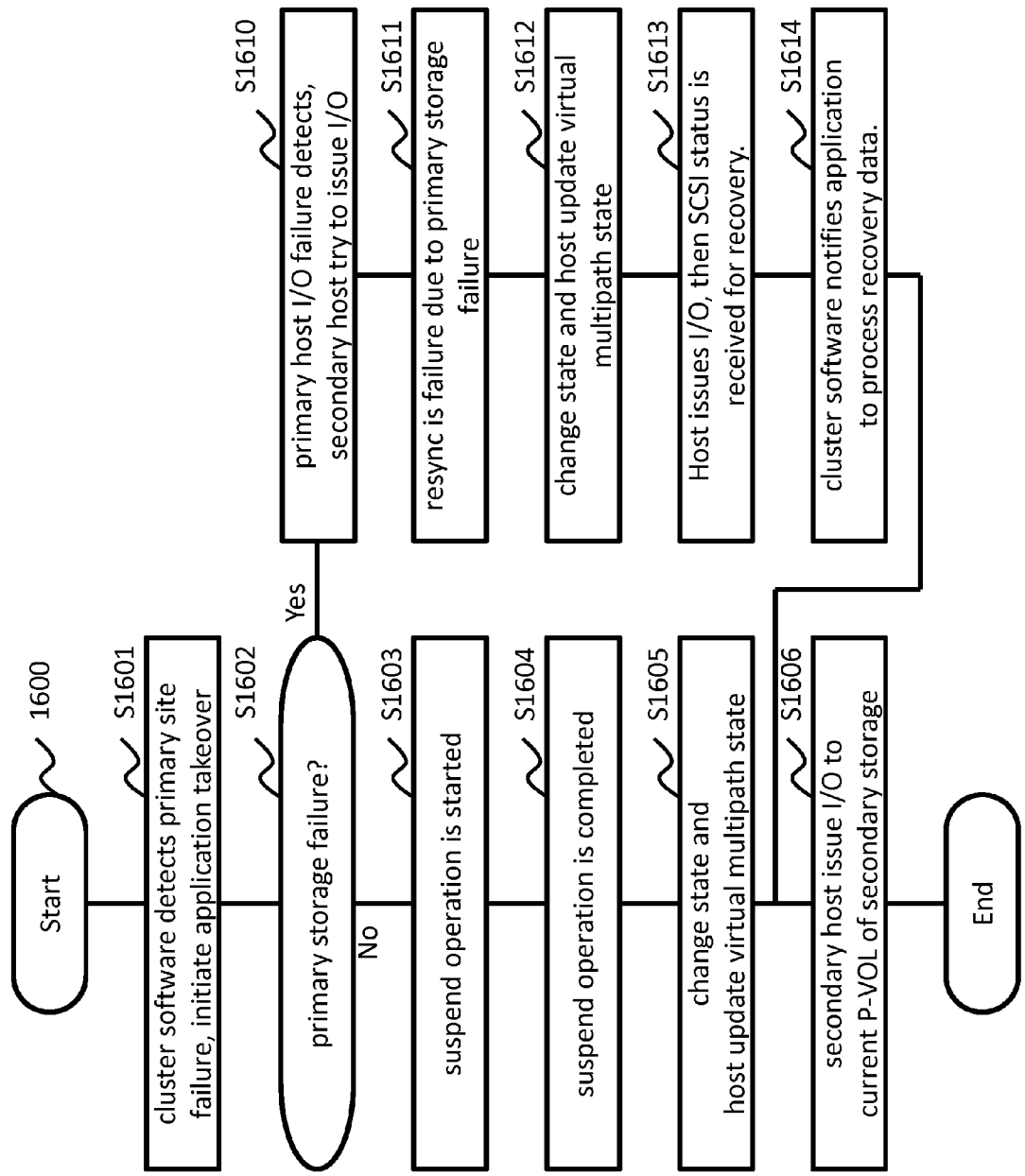
FIG. 16 illustrates an example flow chart for changing the virtual multipath state for an asynchronous copy DR VVOL, in accordance with an example implementation.

FIG. 16 illustrates an example flow chart 1600 for changing the virtual multipath state for an asynchronous copy DR VVOL, in accordance with an example implementation. The flow is similar to the flow of FIG. 14. The difference is that after failure is detected, remote copy failure is taken into account. The description below omits the redundant description of elements from FIG. 14 and illustrates only the differences from the flow of FIG. 14. At S1601, when the primary site fails, the cluster software detects primary site failure and initiates application takeover. At S1602, if the primary storage failed (YES), then the flow proceeds to S1603, otherwise (NO) the flow proceeds to S1610. At S1603, the P-VOL and S-VOL are suspended so that primary storage sync journal data is sent to the S-VOL of the secondary site. If the secondary host issues I/O to the secondary storage of the S-VOL, the secondary storage returns a SCSI response indicating that the secondary storage is suspended due to remote copy procedure, and is waiting notification. At S1604, the DR-VVOL of the virtual storage completes the suspend process. The S-VOL is synced to the P-VOL. At S1605, the virtual storage changes state and the host updates the virtual multipath state. This process is similar to S1405 in FIG. 14. At S1606, the secondary host issues I/O to the P-VOL of the secondary storage.

At S1610, the primary host detects I/O failure, the cluster software provides a notification to the secondary host, and the secondary host initiates application takeover. The secondary host then attempts to issue I/O to the secondary storage. At S1611, the secondary physical storage resync process fails due to primary storage failure. At S1612, the secondary physical storage changes state and the host updates the virtual multipath state. At S1613, the host issues I/O, then the secondary physical storage returns SCSI status with a recovery is required status. At S1614, the secondary physical storage notifies the cluster software to require processing of the recovery data. Custom scripts for checking volume states and coordinating action may also be employed.

Figure 17:
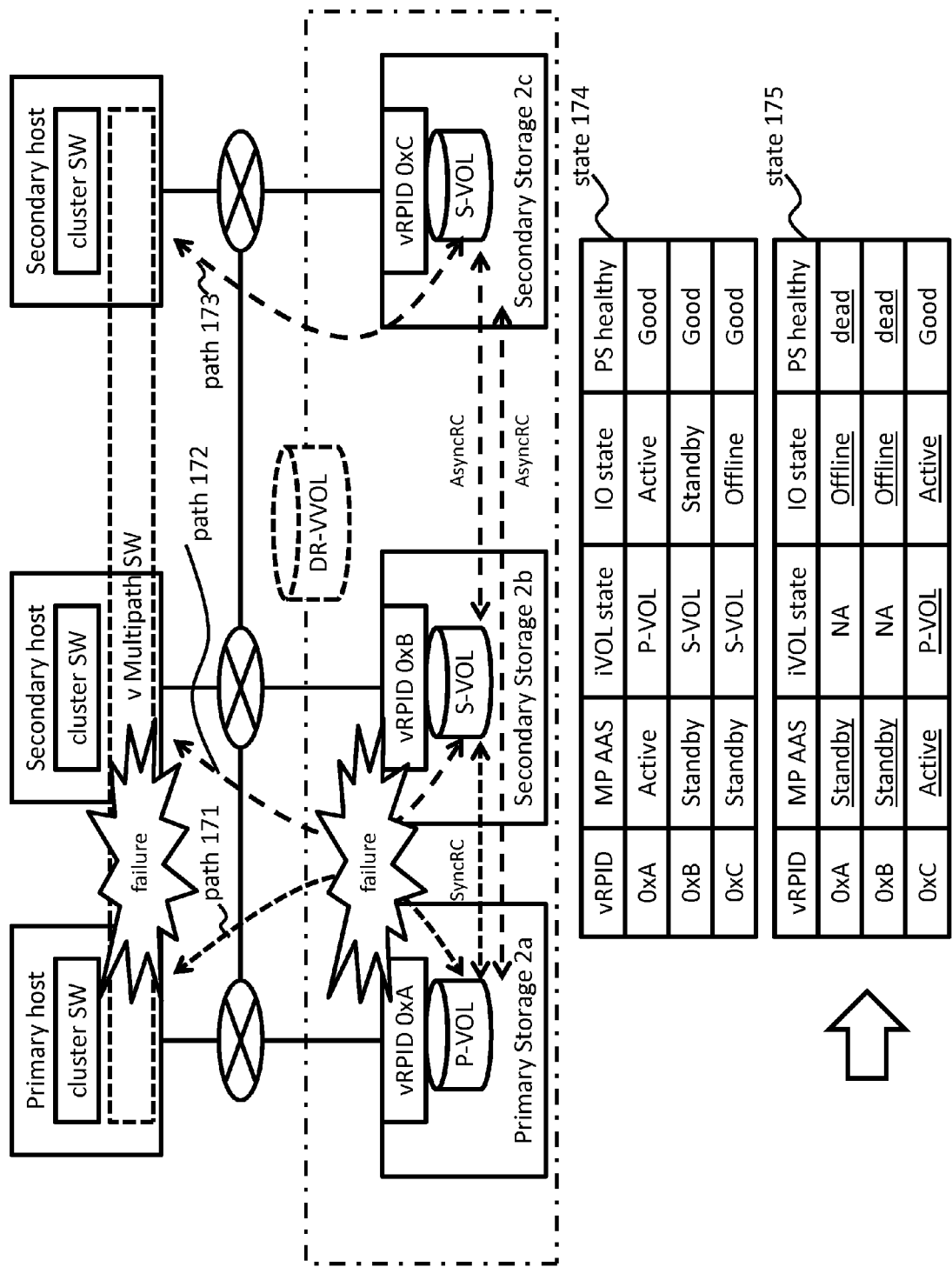
FIG. 17 illustrates changing a virtual multipath for a synchronous and an asynchronous remote copy of a three data center environment due to primary site failure and nearest secondary site failure, in accordance with an example implementation.

FIG. 17 illustrates changing a virtual multipath for a synchronous and an asynchronous remote copy of a three data center environment due to primary site failure and nearest secondary site failure, in accordance with an example implementation. In the example of FIG. 17, the I/O state of paths 171 and 172 are changed to offline, and the I/O state of path 173 is brought online. The state changes for the transition to the remote secondary site as the primary site are illustrated at states 174 and 175. The environment is performed by a combination of the processes described in FIG. 14 and FIG. 16. Further detail of the site selection flow of the virtual storage is described in the description of FIG. 18.

Figure 18:
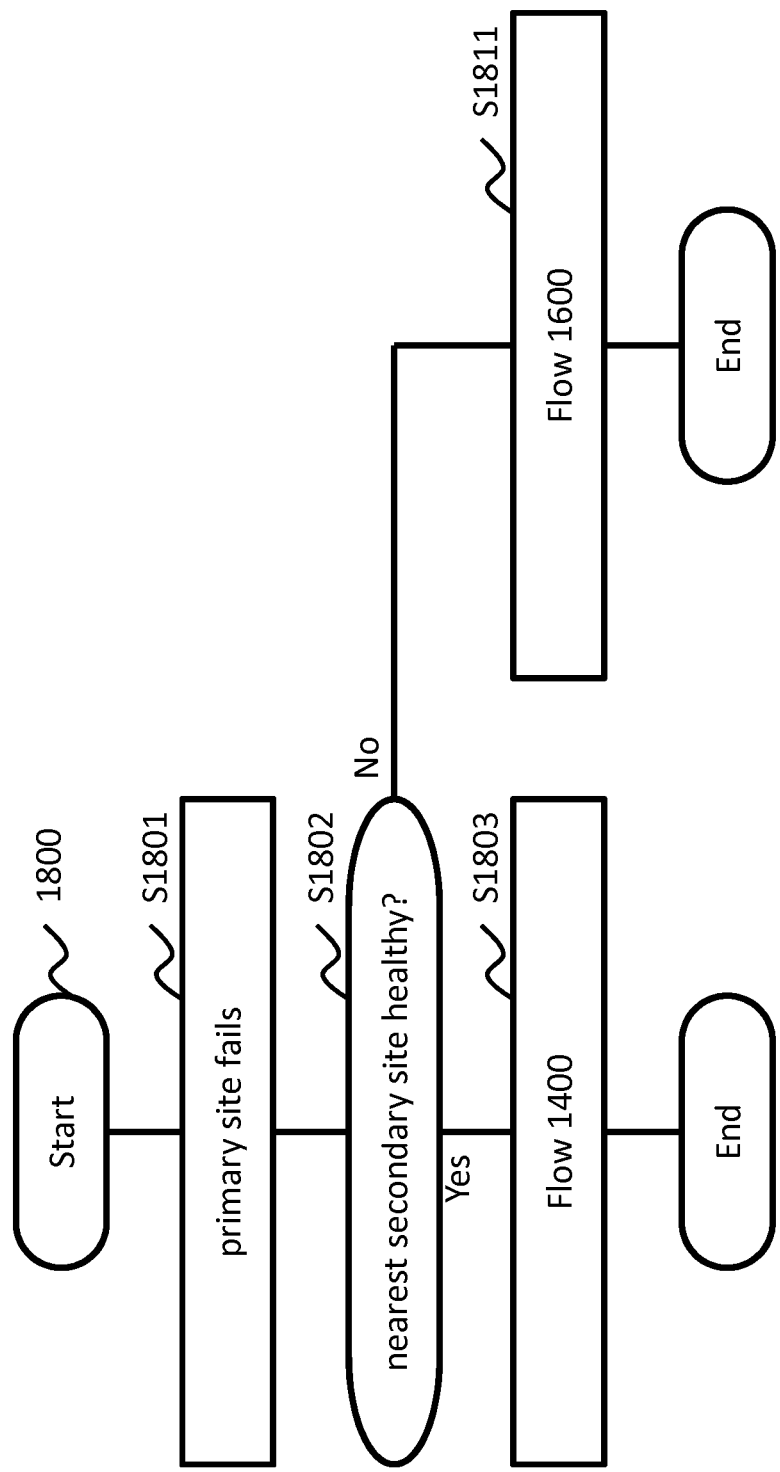
FIG. 18 illustrates the site selection flow of the virtual storage, in accordance with an example implementation.

FIG. 18 illustrates the site selection flow 1800 of the virtual storage, in accordance with an example implementation. At S1801, when the primary site fails, the cluster software detects primary site failure and initiates application takeover. At S1802, a check is performed to see if the nearest secondary site is healthy. If the nearest secondary site is healthy (YES), the flow proceeds to S1803 to invoke the flow of FIG. 14, otherwise (NO), the flow proceeds to S1811 to invoke the flow of FIG. 16.

Figure 19:
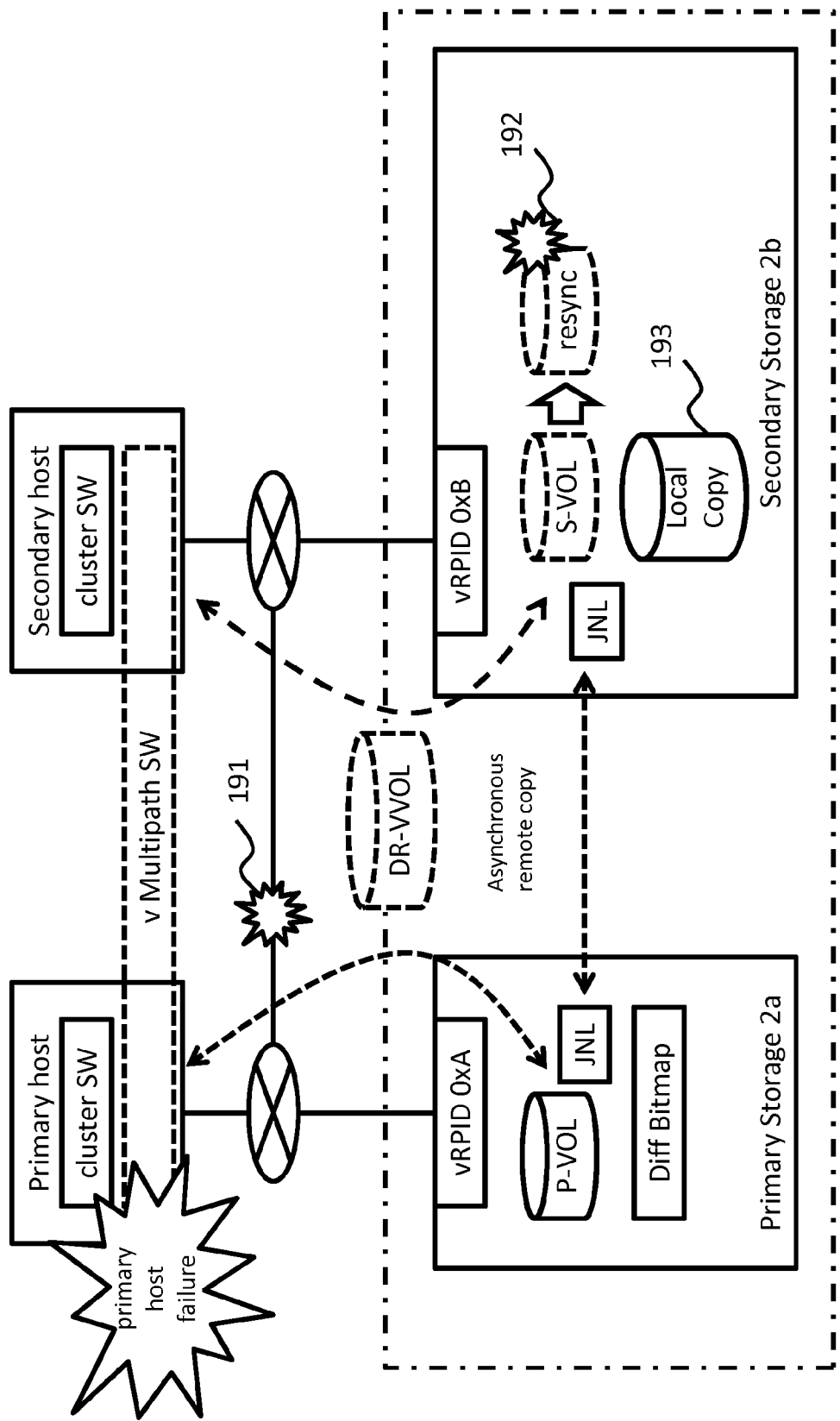
FIG. 19 illustrates changing the virtual multipath to an asynchronous remote copy mode due to primary site failure, in accordance with an example implementation.

FIG. 19 illustrates changing the virtual multipath to an asynchronous remote copy mode due to primary site failure, in accordance with an example implementation. In the example of FIG. 19, when the primary host fails and network failure occurs 191 during the resync process between the primary and the secondary physical storage, then the S-VOL resync process of the secondary storage fails 192 and the S-VOL thereby contains unknown data. To recover from this example, the secondary storage selects the most recent local copy S-VOL (backup volume) 193 for recovery and notifies the host of the new mapping to the backup volume. The host application recovers the volume by using the backup volume 193. Further detail of the flow for this example is described in FIG. 20.

Figure 20:
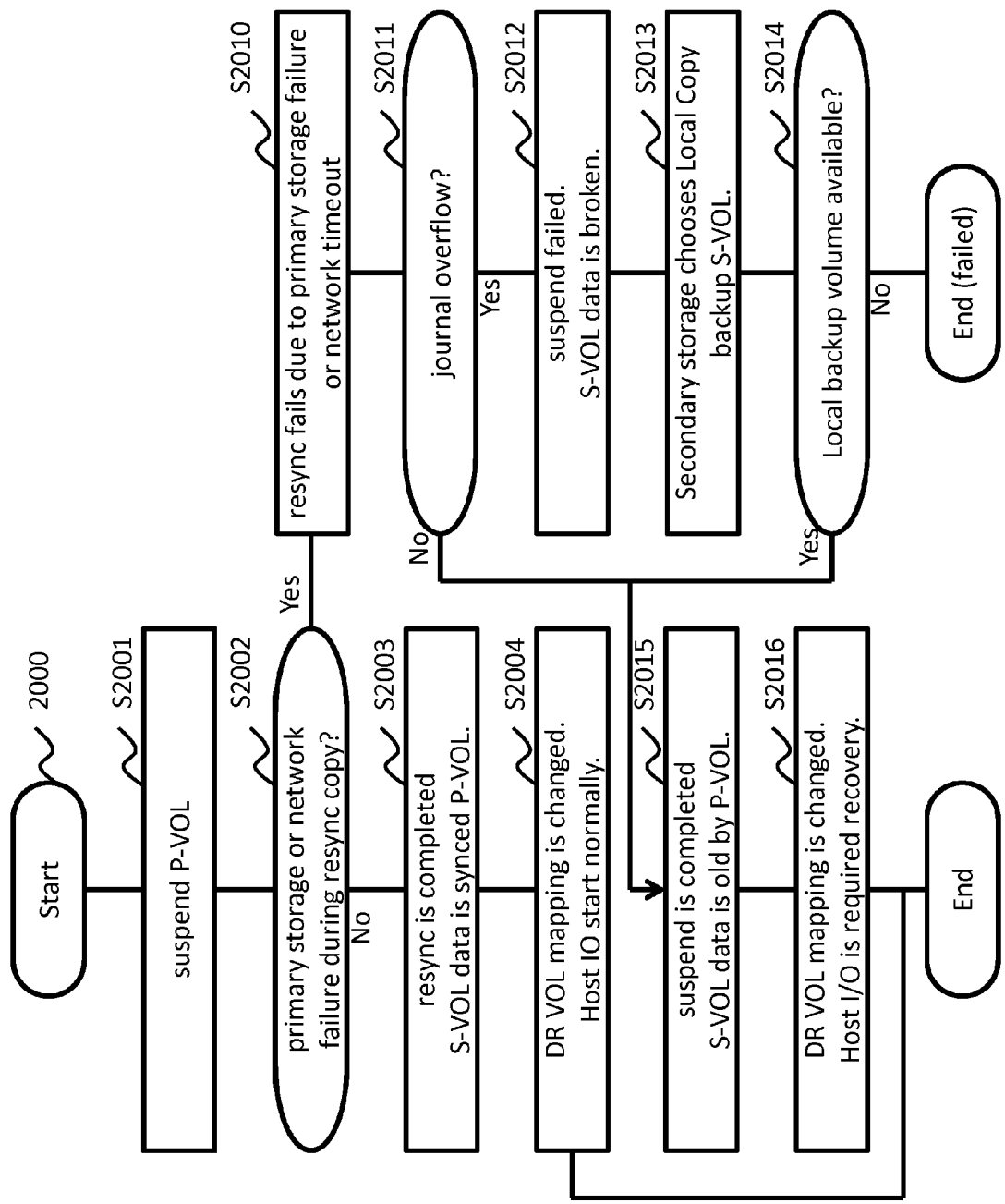
FIG. 20 describes an example flow chart for changing the virtual multipath state for an asynchronous copy DR VVOL, in accordance with an example implementation.

FIG. 20 describes an example flow chart 2000 for changing the virtual multipath state for an asynchronous copy disaster recovery (DR) virtual volume (VVOL), in accordance with an example implementation. At S2001, when the primary host detects primary site failure, the application is moved to the secondary site. The secondary host issues I/O to the secondary host, then the secondary physical storage initiates a suspension of the P-VOL and the S-VOL. At S2002, during the resync copy process of S2001, if the primary storage fails or the network of the remote copy fails, thereby causing the storage to stop to resync (Yes), then the flow proceeds to S2010. Otherwise (No), the flow proceeds to S2003.

At S2003, the resync copy process succeeds, and the resync is completed. The result is that the S-VOL thereby contains the same data as the P-VOL. At S2004, the DR volume mapping is changed (e.g. similar to S1605). The host I/O resumes without application recovery.

At S2010, the resync fails either due to primary storage failure or recovery network failure despite the primary storage being active. For primary storage failure, the recovery process as described in FIG. 16 can be used. The flow for S2010 considers the situation for recovery network failure. At S2011, a check is performed to determine if an overflow occurred in the primary storage journal volume. If not (No), then the flow proceeds to S2015, otherwise, the flow proceeds to S2012.

The flow of S2015 is directed to the resync failure case wherein the overflow of journal data did not occur. At S2015, the secondary storage suspend operation is completed, and only partial resync of the journal data occurred. The virtual storage notifies the host that the recovery DR-VVOL state is old data. At S2016, the virtual storage changes the internal mapping for DR-VVOL. The host recovers the P-VOL old data of the secondary storage as the resync copy data operation was incomplete per S2010, or changes from the P-VOL to local copy volume 193 in the secondary storage. The host I/O resumes after application recovery.

The flow of S2012 is directed to the resync failure case wherein the overflow of journal data occurred. At S2012, the secondary storage suspend process fails due to the overflow of the journal data of the primary volume and the copy data from using bitmap. This results in data inconsistency for the S-VOL of the secondary storage. So the S-VOL cannot be used by the application for recovery. At S2013, the secondary storage chooses a backup volume of the latest local copy of the S-VOL. At S2014, if secondary storage does not have a local copy of the S-VOL (No), then the flow issues a notification indicating failure for rollback of the backup volume. Otherwise (Yes), rollback to the old S-VOL succeeds, and the flow proceeds to S2015.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A plurality of storage systems, comprising:
a first storage system comprising a first logical volume; and
a second storage system comprising a second logical volume;
wherein the first storage system and the second storage system are configured to:
provide a virtual volume from a plurality of virtual volumes to a plurality of computers, the virtual volume having a first status indicating the first logical volume as a primary volume and the second logical volume as a secondary volume forming a pair relationship with the primary volume for a remote copy procedure, such that data is stored to the first logical volume and the second logical volume based on the remote copy procedure, if the data is written from a first computer of the plurality of computers to the virtual volume; and
change a status of the virtual volume from the first status to a second status indicating the second logical volume as the primary volume for an occurrence of failure of the first storage system, so that data is stored to the first logical volume and the second logical volume based on the remote copy procedure, if the data is written from a second computer of the plurality of computers to the virtual volume;
wherein the first storage system and the second storage system are further associated with a multipath asynchronous access state (MPAAS) comprising a physical state and a virtual state of the first logical volume and the second logical volume, the multipath asynchronous access state being indicative as active for the primary volume and standby for the secondary volume;
wherein, for a non-occurrence of failure of the first storage system after initiation of application takeover of the first computer by the second computer, the second storage system is configured to:
suspend the first logical volume and the second logical volume;
synchronize the second logical volume with the first logical volume;
for I/O commands received from the second computer while the first logical volume and the second logical volume is suspended, return a response indicative of the first logical volume and the second logical volume being suspended;
change the status of the virtual volume from the first status to the second status; and
for I/O commands received from the second computer after the change of the status of the virtual volume from the first status to the second status, issue the I/O commands to the second logical volume; and,
wherein, for the occurrence of failure of the first storage system after initiation of application takeover of the first computer by the second computer, the second storage system is configured to:
for failure of synchronization of the second logical volume with the first logical volume, change the status of the virtual volume from the first status to the second status; and
for I/O commands received from the second computer after failure of synchronization of the second logical volume, return a response indicative of recovery being required.

2. The plurality of storage systems of claim 1, further comprising a third storage system comprising a third logical volume, wherein the first status further indicates the third logical volume as a secondary volume forming an asynchronous relationship with the primary volume for the remote copy procedure;
wherein the first storage system, the second storage system, and the third storage system are further configured to change a status of the virtual volume from the first status to a third status indicating the third logical volume as the primary volume for an occurrence of failure of the first storage system and the second storage system, so that data is asynchronously stored to the first logical volume, the second logical volume, and the third logical volume based on the remote copy procedure, if the data is written from a third computer of the plurality of computers to the virtual volume.

3. The plurality of storage systems of claim 1, wherein the first storage system and the second storage system are further configured to store a mapping of the first logical volume and the second logical volume to the virtual volume.

4. The plurality of storage systems of claim 1, wherein the first storage system and the second storage system are further associated with an input/output (I/O) state, the I/O state being indicative as active for the primary volume and standby for the secondary volume.

5. The plurality of storage systems of claim 1, wherein for the occurrence of failure for the first storage system, the first storage system and the second storage system are further configured to provide access for the first computer to the second logical volume via the second computer.

6. The plurality of storage systems of claim 1, wherein the first storage system and the second storage system are further associated with a physical storage health status indicating the occurrence of failure.

7. The plurality of storage systems of claim 1, wherein the first storage system and the second storage system are further configured to:
  on the occurrence of failure of the first storage system, suspend access to the first logical volume and the second logical volume, and synchronize the first logical volume and the second logical volume through the remote copy procedure, wherein the remote copy procedure is asynchronous;
  on an occurrence of failure of the first computer, change the status of the virtual volume from the first status to the second status, and further provide a recovery required status for the primary volume.

8. The plurality of storage systems of claim 1, wherein the first storage system and the second storage system are further configured to:
  on the occurrence of failure of the first storage system, remap the virtual volume from the first logical volume to the second logical volume, and synchronize the first logical volume and the second logical volume through the remote copy procedure, wherein the remote copy procedure is synchronous;
  on an occurrence of failure of the first computer, change the status of the virtual volume from the first status to the second status, remap the virtual volume from the first logical volume to the second logical volume, and synchronize the first logical volume and the second logical volume through the remote copy procedure, wherein the remote copy procedure is synchronous.

9. The plurality of storage systems of claim 1, wherein, for occurrence of failure of the first storage system:
  for the physical state of the first logical volume indicative of being failed, change the multipath asynchronous access state associated with the first storage system to offline; and
  for the physical state of the first logical volume indicative of not being failed, change the multipath asynchronous access state associated with the first storage system to standby.

10. A storage system comprising:
  a controller; and
  a plurality of storage devices controlled by the controller, the controller managing a logical volume corresponding to the plurality of storage devices;
  wherein the controller is configured to:
    provide a virtual volume from a plurality of virtual volumes to a plurality of computers, the virtual volume having a first status indicating an external logical volume associated with an external storage system as a primary volume and the logical volume as a secondary volume forming a pair relationship with the primary volume for a remote copy procedure, such that data is stored to the external logical volume and the logical volume based on the remote copy procedure, if the data is written from a first computer of the plurality of computers to the virtual volume; and
    change a status of the virtual volume from the first status to a second status indicating the logical volume as the primary volume for an occurrence of failure of the external storage system, so that data is stored to the external logical volume and the logical volume based on the remote copy procedure, if the data is written from a second computer of the plurality of computers to the virtual volume;
    associate the storage system and the external storage system with a multipath asynchronous access state (MPAAS) comprising a physical state and a virtual state of the external logical volume and the logical volume, the multipath asynchronous access state being indicative as active for the primary volume and standby for the secondary volume;
  wherein, for a non-occurrence of failure of the external storage system after initiation of application takeover of the first computer by the second computer, the controller is configured to:
    suspend the external logical volume and the logical volume;
    synchronize the logical volume with the external logical volume;
    for I/O commands received from the second computer while the external logical volume and the logical volume is suspended, return a response indicative of the external logical volume and the logical volume being suspended;
    change the status of the virtual volume from the first status to the second status; and
    for I/O commands received from the second computer after the change of the status of the virtual volume from the first status to the second status, issue the I/O commands to the logical volume; and,
  wherein, for the occurrence of failure of the external storage system after initiation of application takeover of the first computer by the second computer, the controller is configured to:
    for failure of synchronization of the logical volume with the external logical volume, change the status of the virtual volume from the first status to the second status; and
    for I/O commands received from the second computer after failure of synchronization of the logical volume, return a response indicative of recovery being required.

11. The storage system of claim 10, wherein the first status further indicates a secondary external logical volume associated with a secondary external storage system as a secondary volume forming an asynchronous relationship with the primary volume for the remote copy procedure;
  wherein the controller is further configured to change a status of the virtual volume from the first status to a third status indicating the secondary external logical volume as the primary volume for an occurrence of failure of the external storage system and the storage system, so that data is asynchronously stored to the logical volume, the external logical volume, and the secondary external logical volume based on the remote copy procedure, if the data is written from a third computer of the plurality of computers to the virtual volume.

12. The storage system of claim 10, wherein the controller is further configured to store a mapping of the external logical volume and the logical volume to the virtual volume.

13. The storage system of claim 10, wherein the controller is further configured to associate the storage system and the external storage system with an input/output (I/O) state, the I/O state being indicative as active for the primary volume and standby for the secondary volume.

14. The storage system of claim 10, wherein for the occurrence of failure for the external storage system, the controller is configured to provide access for the first computer to the logical volume via the second computer.

15. The storage system of claim 10, wherein the controller is further configured to associate the external storage system and the storage system with a physical storage health status indicating the occurrence of failure.

16. The storage system of claim 10, wherein the controller is further configured to:
  on the occurrence of failure of the external storage system, suspend access to the external logical volume and the logical volume, and synchronize the external logical volume and the logical volume through the remote copy procedure, wherein the remote copy procedure is asynchronous;
  on an occurrence of failure of the first computer, change the status of the virtual volume from the first status to the second status, and further provide a recovery required status for the primary volume.

17. The storage system of claim 10, wherein the controller is further configured to:
  on the occurrence of failure of the external storage system, remap the virtual volume from the external logical volume to the logical volume, and synchronize the external logical volume and the logical volume through the remote copy procedure, wherein the remote copy procedure is synchronous;
  on an occurrence of failure of the first computer, change the status of the virtual volume from the first status to the second status, remap the virtual volume from the external logical volume to the logical volume, and synchronize the external logical volume and the logical volume through the remote copy procedure, wherein the remote copy procedure is synchronous.

18. A non-transitory computer readable medium storing instructions for executing a process, the instructions comprising:
  providing a virtual volume from a plurality of virtual volumes to a plurality of computers, the virtual volume having a first status indicating a first logical volume associated with a first storage system as a primary volume and a second logical volume associated with a second storage system as a secondary volume forming a pair relationship with the primary volume for a remote copy procedure, such that data is stored to the first logical volume and the second logical volume based on the remote copy procedure, if the data is written from a first computer of the plurality of computers to the virtual volume; and
  changing a status of the virtual volume from the first status to a second status indicating the second logical volume as the primary volume for an occurrence of failure of the first storage system, so that data is stored to the first logical volume and the second logical volume based on the remote copy procedure, if the data is written from a second computer of the plurality of computers to the virtual volume;
  wherein the first storage system and the second storage system are further associated with a multipath asynchronous access state (MPAAS) comprising a physical state and a virtual state of the first logical volume and the second logical volume, the multipath asynchronous access state being indicative as active for the primary volume and standby for the secondary volume;
    wherein, for a non-occurrence of failure of the first storage system after initiation of application takeover of the first computer by the second computer, executing a process for the second storage system comprising:
      suspending the first logical volume and the second logical volume;
      synchronizing the second logical volume with the first logical volume;
      for I/O commands received from the second computer while the first logical volume and the second logical volume is suspended, returning a response indicative of the first logical volume and the second logical volume being suspended;
      changing the status of the virtual volume from the first status to the second status; and
      for I/O commands received from the second computer after the change of the status of the virtual volume from the first status to the second status, issuing the I/O commands to the second logical volume; and,
    wherein, for the occurrence of failure of the first storage system after initiation of application takeover of the first computer by the second computer, executing a process for the second storage system comprising:
      for failure of synchronization of the second logical volume with the first logical volume, changing the status of the virtual volume from the first status to the second status; and
      for I/O commands received from the second computer after failure of synchronization of the second logical volume, returning a response indicative of recovery being required.

19. The non-transitory computer readable medium of claim 18, wherein the instructions further comprise:
  changing a status of the virtual volume from the first status to a third status indicating a third logical volume as the primary volume for an occurrence of failure of the first storage system and the second storage system, so that data is asynchronously stored to the first logical volume, the second logical volume, and the third logical volume based on the remote copy procedure, if the data is written from a third computer of the plurality of computers to the virtual volume; and
  wherein the first status further indicates the third logical volume as a secondary volume forming an asynchronous relationship with the primary volume for the remote copy procedure.

* * * * *